United States Patent
Dike

[15] 3,679,785
[45] July 25, 1972

[54] METHOD OF FORMING AN INTEGRAL ONE-PIECE PLASTIC CONTAINER AND CARRYING HANDLE

[72] Inventor: Roy W. Dike, Tempe, Ariz.
[73] Assignee: Continental Can Company, Inc., New York, N.Y.
[22] Filed: May 17, 1968
[21] Appl. No.: 730,119

Related U.S. Application Data

[63] Continuation-in-part of Ser. No. 250,058, Jan. 8, 1963, Pat. No. 3,441,172.

[52] U.S. Cl...............................264/98, 264/161, 425/326, 425/806
[51] Int. Cl......................................B29c 17/07, B29c 17/12
[58] Field of Search ..............264/98, 94, 161; 425/326, 806

[56] References Cited

UNITED STATES PATENTS 3,369,690  2/1968  Hayes .................................264/98 X

FOREIGN PATENTS OR APPLICATIONS 612,435  11/1960  Italy........................................264/94

Primary Examiner—Robert F. White
Assistant Examiner—J. H. Silbaugh
Attorney—Diller, Brown, Ramik & Holt

[57] ABSTRACT

This disclosure relates to a method of forming an integral container and carrying handle by extruding a tube of plastic material, forming a first portion of the tube into an inverted generally U-shaped handle, forming another portion of the tube into a container body having a neck spanned by the handle, and removing waste material from between the handle and the neck to form the inner outline of the handle and form an opening of the neck.

2 Claims, 6 Drawing Figures

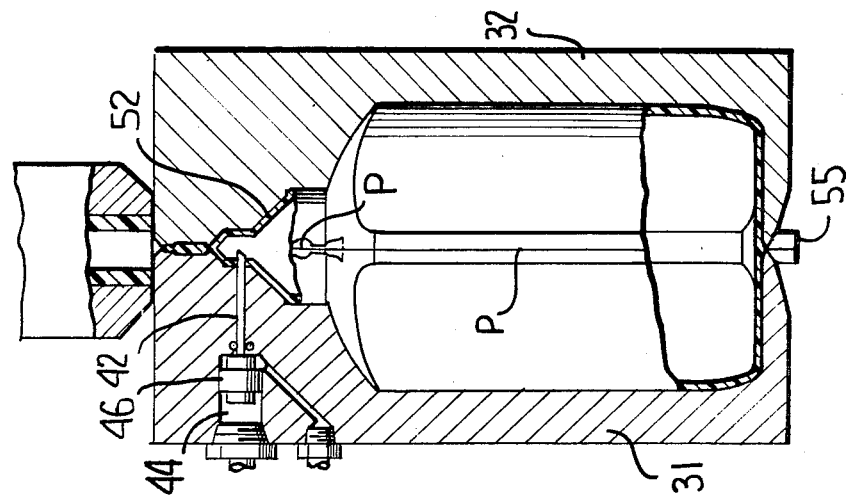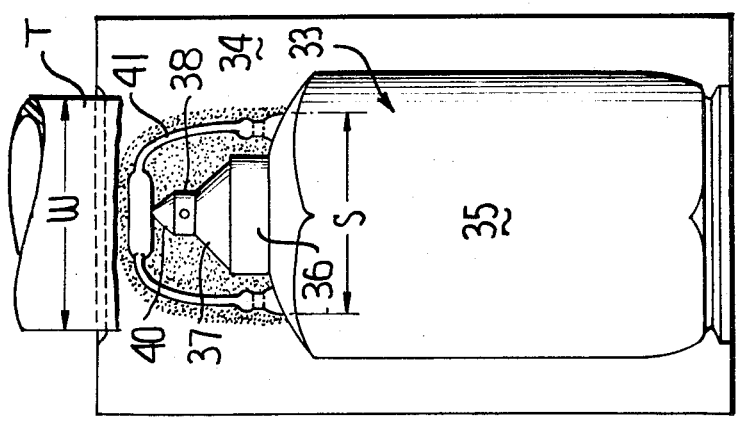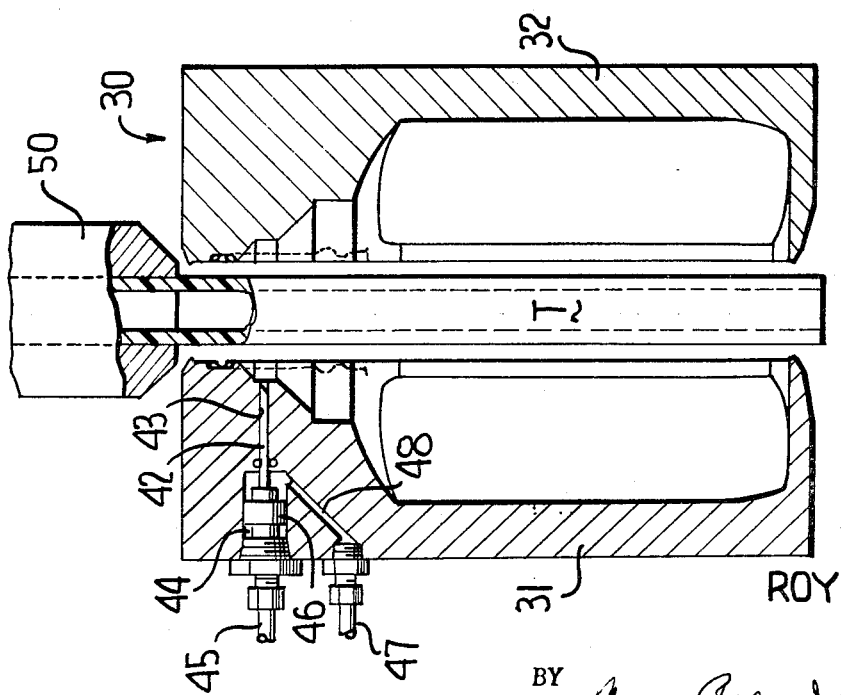

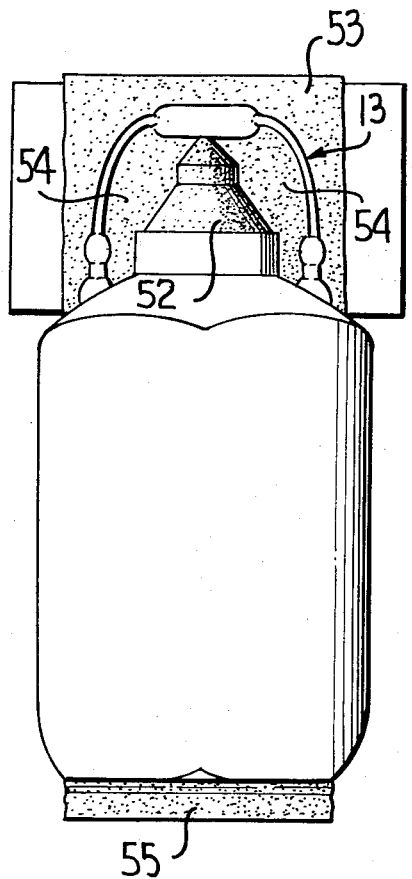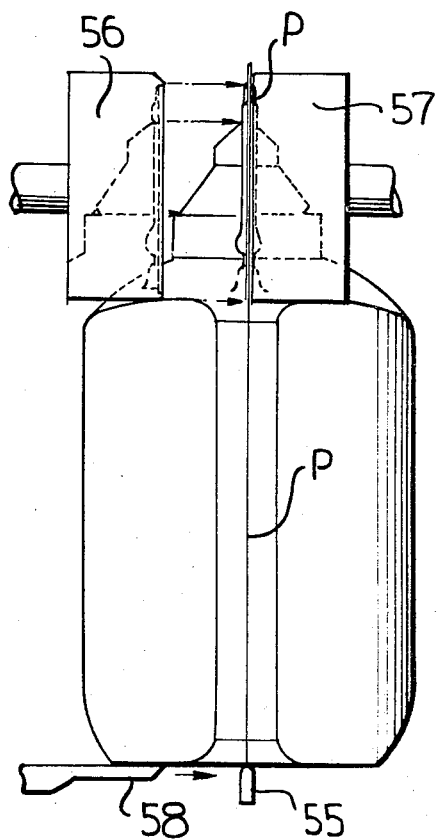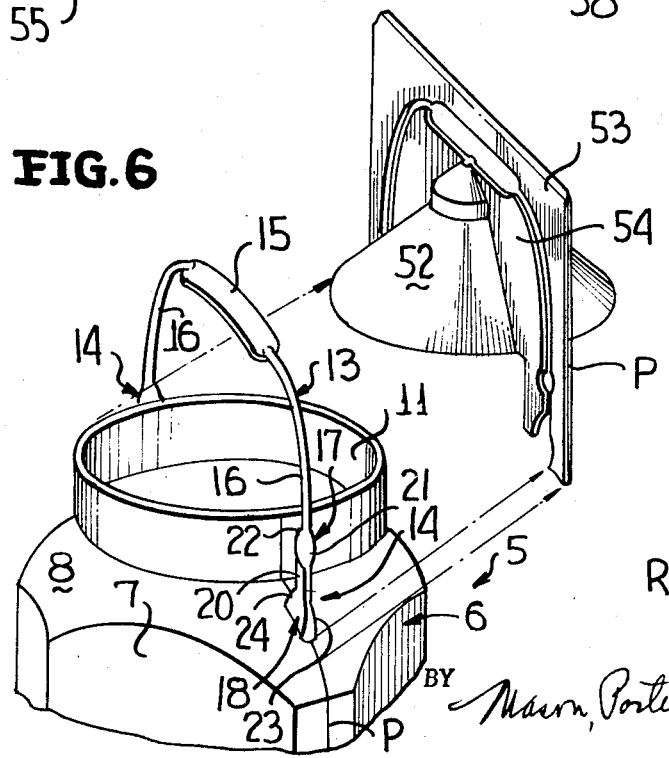

METHOD OF FORMING AN INTEGRAL ONE-PIECE PLASTIC CONTAINER AND CARRYING HANDLE

This application is a continuation-in-part of copending application Ser. No. 250,058, filed Jan. 8, 1963, and now U.S. Pat. No. 3,441,172.

A primary object of this invention is to provide a novel method of forming an integral, one-piece, plastic container having an inverted generally U-shaped carrying handle which spans a neck of the container body, and the method includes the steps of extruding a tube of plastic material, forming a first portion of the tube into an inverted generally U-shaped handle, forming another portion of the tube into a container body having a neck spanned by the handle, and removing waste or flash material from between the handle and the neck to form the inner outline of the handle and/or form an opening of the neck.

A further object of this invention is to provide a novel method of forming a container and carrying handle as heretofore noted wherein the handle is formed by flattening an extruded plastic tube between mold bodies of a split-mold.

With the above and other objects in view that will hereinafter appear, the nature of the invention will be more clearly understood by reference to the following detailed description, the appended claimed subject matter, and the several views illustrated in the accompanying drawings.

IN THE DRAWINGS:

FIG. 1 is a sectional view of a split-mold, and illustrates a tube of plastic material being extruded between mold bodies prior to the latter being closed.

FIG. 2 is an elevational view of the left-hand mold body of FIG. 1, and illustrates the general configuration of the mold cavity thereof which is identical to that of the right-hand mold body of FIG. 1.

FIG. 3 is a sectional view similar to FIG. 1, and illustrates the split-mold in its closed position and the manner in which the container body and carrying handle are formed therein.

FIG. 4 is a side elevational view of the container and carrying handle after being removed from the split-mold, and illustrates waste or flash material which is to be removed to complete the formation of the container.

FIG. 5 is a side elevational view of the container of FIG. 4 rotated 90° and illustrates the manner in which the waste or flash material is removed to complete the formation of the container.

FIG. 6 is a fragmentary perspective view of the completed container and carrying handle, and illustrates the portion of waste material removed to complete the container.

Before describing the novel method of this invention, reference is first made to FIG. 6 of the drawings which illustrates an integral, one-piece container and carrying handle which is generally designated by the reference numeral 5. The container and carrying handle 5 comprise a container body 6 having an upper end portion 7 terminating at an annular shoulder 8 of a substantial radial depth which terminates radially inwardly at an integral upstanding neck 10 having an opening 11. A carrying handle or bail 13 of a generally inverted U-shaped configuration is integrally joined to the annular shoulder 8 of the container body 6 by a pair of identical flexible hinge joints 14. The bight portion of the U-shaped carrying handle or bail 13 is flattened to provide a hand-grip portion 15. A leg 16 of the U-shaped carrying handle 13 depends downwardly from the hand-grip portion 15 at each end thereof and terminates at a respective one of the flexible hinge joints 14. Each of the flexible hinge joints 14 has a thinned upper handle joining portion 17 integrally connected to a thickened lower shoulder joining portion 18 by a thin flexible hinge 20.

The handle joining portions 17 of the respective flexible hinge joints 14 include a bulbous body portion 21 tapering upwardly at 22 and integrally joined to the leg 16 of the U-shaped carrying handle 13. The shoulder joining portion 18 of each of the flexible hinge joints 14 includes a bulbous body portion 23 tapering upwardly and joined to the thin flexible hinge 20 by a gradually upwardly sloping shoulder portion 24. The taper 22 of the handle joining portion 17 and the gradually upwardly sloping shoulder 24 of the shoulder joining portion 18 allow stresses to be more evenly distributed across the thin flexible hinge 20 when the container body 6 is being carried by the handle 13.

The flexible hinge joints 14 are joined to the annular shoulder 8 of the container body 6 in diametrically opposed relationship, and the thin flexible hinges 20 are coplanar and in a plane taken through the axis of the body which corresponds to a plane passing through abutting portions of a split-mold in which the container and carrying handle is formed, as will appear more fully hereafter.

The container body 6 may include a pair of snap-lock portions (not shown) integrally formed in the annular shoulder 8 in the manner set forth in the noted application to maintain the handle 13 in an out-of-the-way position when the container body 6 is being filled or closed.

Reference is now made to FIGS. 1 through 3 of the drawings which illustrate a split-mold 30 defined by a pair of generally identical mold bodies 31, 32. Each of the mold bodies 31, 32 includes a generally identical cavity 33 opening outwardly of a uniplanar surface 34. Each mold cavity 33 includes a main cavity portion 35 which corresponds in configuration to that of the container body 6, the shoulder 8 and the neck 10. Above a generally semi-cylindrical cavity portion 36 of each of the cavities in which the neck 10 is formed is a generally frusto-conical cavity portion 37, another semi-cylindrical cavity portion 38 and a generally triangular cavity portion 40.

A handle-forming cavity 41 also opens outwardly through the surface 34 of each of the mold bodies 31, 32 and the configuration of the cavity 41 corresponds to that of the carrying handle 13 of FIG. 6.

The mold body 31 includes a conventional blow needle 42 mounted for reciprocable movement in a bore 43 which opens into the semi-cylindrical cavity portion 38, as is best illustrated in FIG. 2. Fluid introduced into a chamber 44 through a conduit 45 to the left of a piston 46 moves the blow needle 42 from the position shown in FIG. 1 to the position shown in FIG. 3, while fluid introduced to the right of the piston 46 through a conduit 47 and a passage 48 causes reverse movement of the blow needle 42.

The split-mold 30 is one of a plurality of split-molds which are preferably mounted for rotation relative to a nozzle 50 of an extrusion machine (not shown) in the manner disclosed in the patent to Elmer E. Mills, U.S. Pat. No. 2,579,390. As each open mold 30 is presented to the extrusion nozzle 50, a soft plastic tube T is positioned between the split-molds 31, 32 in the manner best illustrated in FIG. 1. The tube T may be, for example, polyethylene, polypropylene, vinyl, or any other thermoplastic resin formula, and the cross-sectional configuration thereof is generally rectangular having a width W which is greater than the maximum span S of the handle cavities 41, as is clearly illustrated in FIG. 2.

Upon the closing of the mold bodies 31, 32 upper and lower end portions thereof are pinched closed, as is best illustrated in FIG. 3 of the drawings. During this pinching operation, the upper portion of the tube T is flattened or compressed which causes the handle forming cavity 41 to be completely filled. The stippled area in FIG. 2 indicates a portion of the surfaces 34 of each of the mold bodies 31, 32 which can be relieved to provide a flash cavity for additional material which is flattened or compressed between the stippled portions of the mold bodies 31, 32 upon the closing of the split-mold 30. A similar flash-receiving relieved portion may be provided outboard of the cavity 41, as indicated by the stippling thereat.

After the split-mold 30 has been closed air is introduced into the chamber 44 through the conduit 45 which moves the blow needle 42 from the position shown in FIG. 1 to the position shown in FIG. 3 causing the perforation of the tube T and the eventual expansion thereof to the configuration illustrated in FIG. 3 by the air introduced into the tube through the blow needle 42. As a result, the container body 7, the annular shoulder 8 and the neck 10 are formed, although it is to be noted that the latter is closed by a generally inverted funnel-shaped piece of waste material 52 which is contoured to the general configuration of the cavity portions 37, 38 and 40 (FIGS. 2, 3 and 6).

The mold bodies 31, 32 of the split-mold 30 are then opened after the blow needle 42 is again retracted, after which the container appears as shown in FIG. 4 and includes a flattened portion of waste or flash material 53 on the exterior of the handle 13, a flattened portion of waste or flash material 54 interiorly of the handle 13, and the inverted funnel-shaped waste portion 52. Upon the removal of the waste portions 52 through 54 and a waste portion 55 adjacent the bottom end of the container, formation of the latter is completed. While various different means may be provided for removing the waste portions 52 through 54 and 55, in accordance with this invention, a pair of relatively reciprocal cutting dies 56, 57 are provided and are appropriately contoured to remove the waste material in two pieces, as shown in FIG. 6. The die 57 is illustrated in a position having already severed through the right-hand portion of the waste material upon movement from right-to-left while upon left-to-right movement of the die 56, the waste material 52 through 54 is completely severed resulting in the formation of the opening 11 of the neck and the inner and outer outlines of the handle 13.

The flash material 55 can similarly be removed by a conventional shear 58.

From the foregoing it will be readily apparent that due to the particular construction of the cavities 33, 41, one-half of each container body and carrying handle is in effect formed in each mold body 31, 32 with a plane through the abutting surfaces 34 passing through the parting or flash line P of the container body 7, the hinge means 14 and the handle 13.

While only a preferred method of and apparatus for forming integral, one-piece plastic containers and carrying handles has been disclosed in this application, it is to be understood that equivalent departures therefrom are included and encompassed by this disclosure.

I claim:

1. A method of forming an integral container and carrying handle comprising the steps of extruding a tube of plastic material, forming a first portion of the tube into an inverted generally U-shaped handle, forming another portion of the tube into a container body having a neck spanned by a bight portion of the handle and end portions of said handle being connected to diametrically opposite points of said container body with a uniplanar axial plane through said body passing through said bight portion and said end portions, said handle is formed by flattening the tube first portion resulting in the formation of removable plastic material between the handle and the neck, and removing the removable plastic material to form the inner outline of the handle and form an opening of the neck.

2. A method of forming an integral container and carrying handle comprising the steps of introducing a tube of plastic material into a split-mold, flattening a portion of the tube to an inverted U-shaped configured handle by closing the split-mold, expanding the unflattened portion of the tube to form a container body having a neck directed toward and in underlying relationship to a bight portion of the handle with opposite end portions of the handle joined to diametrically opposite points of said container body, wherein during the closing of the split-mold removable waste material is formed between the handle and the neck, and including the further step of removing the waste material to form the inner outline of the handle and form an opening of the neck.

* * * * *